Patented Feb. 6, 1945

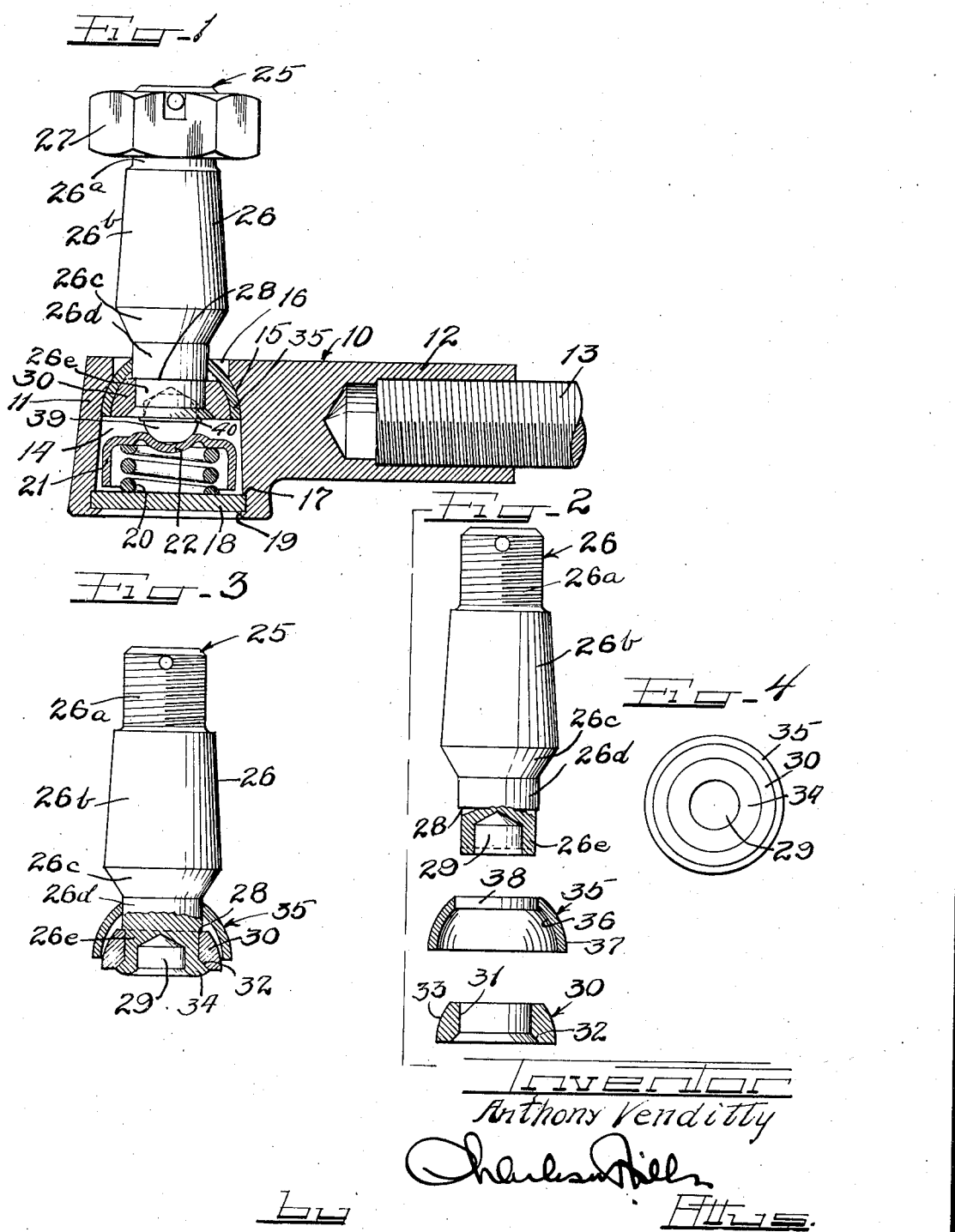

2,369,091

UNITED STATES PATENT OFFICE 2,369,091

STUD ASSEMBLY

Anthony Venditty, Detroit, Mich., assignor to Thompson Products, Inc., a corporation of Ohio Application March 15, 1943, Serial No. 479,235

8 Claims. (Cl. 287—90)

This invention relates to an assembly of metal parts with each part composed of a metal best suited to resist the stresses and wear imposed thereon during operation and with the parts so arranged as to cooperate in an efficient manner.

Specifically the invention relates to a stud assembly especially adapted for tie rod joints wherein a stud member composed of tough stress resisting metal has a bearing ring composed of hard wear resisting metal pressed and riveted thereon and receives thereover a seat member also composed of hard wear resisting metal.

The invention will hereinafter be specifically described as embodied in a tie rod joint or tie rod end assembly but it should be understood that the invention is not limited to such an embodiment inasmuch as it is generally applicable to machine elements or parts subjected to stresses as well as wear.

In accordance with this invention a stud composed of tough heat treated steel such as S. A. E. 1020 steel is provided with a cylindrical end portion terminating in an external shoulder. A bearing ring composed of very hard heat treated steel such as S. A. E. 1010 steel is pressed onto the cylindrical end portion of the stud to be bottomed on the shoulder of the stud. This hard bearing ring has a spherical shaped side wall and a flat recessed bottom. The end portion of the stud is spread outwardly into the recess of the ring to rivet the ring onto the stud. A very hard heat treated metal seat which can be composed of the same steel as the bearing ring is disposed around the bearing ring. This seat has an internal bearing wall for seating on the side wall of the ring together with an external bearing wall for seating in a socket. The seat also has an aperture defining wall for snugly engaging the stud. This wall is spaced above the top of the bearing ring so that the bearing ring can move further into the seat as wear develops between the parts.

In tie rod ends, the stud assemblies of this invention will tilt in tie rod end sockets on the external wall of the seat since the stud will carry the seat with it during tilting movement. A rotation of the stud about its own axis on the other hand can be borne on the inner wall of the seat and outer wall of the bearing ring. The stud itself is subjected to stress loads and by being composed of a tough heat treated steel it can effectively resist these loads. Such tough steels however are not hard enough to make good bearing surfaces and therefore in accordance with this invention the bearing surfaces of the assemblies are composed of very hard steel. These steels, contrary to the tough steels, are too brittle to withstand heavy stresses and shock loads but the manner in which they are assembled on the tough stud, according to this invention, eliminates possibility of damage. Since the bearing members are composed of very hard steels they will effectively resist wear.

It is then an object of this invention to provide an assembly of metal parts each composed of metals for best carrying out their functions.

A further object of the invention is to provide a composite stud assembly composed of tough and hard heat treated metal parts.

A still further object of this invention is to provide a stud assembly wherein a tough heat treated stud has a hard wear resisting bearing ring pressed thereon and wherein the bearing ring bottoms a hard wear resisting hollow metal seat.

Another object is to provide a stud assembly especially useful in tie rod joints including a tough metal stud with a hard metal bearing ring secured on an end thereof and a separate seat member loosely retained around the stud to seat on the bearing ring.

Other and further objects of the invention will be apparent to those skilled in the art from the following detailed description of the annexed sheet of drawings which, by way of preferred example only, illustrates one embodiment of the invention.

On the drawing:

Figure 1 is a vertical cross-sectional view, with parts in elevation, of a tie rod joint having a stud assembly according to this invention;

Figure 2 is an exploded side elevational view, with parts in vertical cross-section, of the members forming the stud assembly of this invention and illustrating the shape of the stud prior to the riveting or heading operation;

Figure 3 is a side elevational view, with parts broken away and shown in vertical cross-section, of a stud assembly according to this invention prior to cutting off of the riveted end of the stud; and Figure 4 is a bottom plan view of the stud assembly of this invention.

As shown on the drawing:

In Figure 1 the reference numeral 10 designates generally a tie rod end embodying the stud assembly according to this invention. The tie rod end 10 is composed of a socket 11 having a laterally extending hollow shank portion 12 receiving a tie rod 13 in threaded relation therein. The socket 11 has a socket chamber 14 with a fragmental spherical internal bearing wall 15 providing a reduced circular opening 16 at the top end of the socket. The bottom end of the socket has an internal shoulder 17 receiving a closure plate or disk 18 thereagainst. The disk or closure plate 18 is secured in position in the socket by spinning the end of the socket thereover as shown at 19.

A spring 20 is bottomed on the closure plate 18 and is encased in a cup member 21 having a top wall with a segmental spherical dimple or recess 22 therein. The spring 20 urges the cup member 21 toward the bearing wall 15 of the socket.

In accordance with this invention a stud assembly 25 is tiltable and rotatable in the socket and projects freely through the opening 16 of the socket. The assembly 25 is composed of a tough heat treated steel stud member 26 with a threaded cylindrical free end portion 26a receiving a nut 27 therearound. A tapered portion 26b extends from the threaded portion 26a and is adapted to receive the eye end of a steering arm (not shown) therearound. The large end of the tapered portion 26b terminates in a reversed tapered portion 26c. The small end of this tapered portion 26c merges into a cylindrical portion 26d. A reduced diameter cylindrical portion 26e depends beneath the cylindrical portion 26d and a flat annular shoulder 28 is provided between the cylindrical portions 26d and 26e.

As best shown in Figure 2 the cylindrical portion 26e has an axial cylindrical well 29 extending inwardly from the end face thereof.

A very hard heat treated steel bearing ring 30 is pressed onto the cylindrical portion 26e of the stud and is bottomed on the shoulder 28. As best shown in Figure 2 this bearing ring 30 has a cylindrical bore 31 therethrough slightly smaller than the diameter of the cylindrical portion 26e so that a press fit between the stud and bearing ring will be obtained. The bore 31 terminates at the lower end of the ring 30 in an outwardly flaring mouth 32 to provide a recess around that portion of the stud 26e beneath the bore 31 when the ring 30 is bottomed on the shoulder 28.

The ring 30 has an external side wall 33 of a shape accommodating tilting movement such as a segmental spherical shape.

When the ring 30 is press fitted onto the cylindrical portion 26e of the stud so as to be bottomed on the shoulder 28 the free end of the stud is peened over or spread into the recess 32 of the ring as shown at 34 in Figure 3. The ring 30 is thus press fitted and riveted onto the stud 26. Any portion of the stud material 34 beneath the flat bottom of the ring 30 can be ground off. Since the cylindrical portion 26e of the stud has the recess 29 therein the rivet head or spread portion of the stud can be readily formed by a spinning operation.

A very hard heat treated hollow seat member 35 in the form of a hemispherical cup has an inner bearing wall 36 adapted to seat on the side wall 33 of the bearing ring 30, together with an outer bearing wall 37 adapted to seat on the bearing wall 15 of the socket.

The cup 35 has a circular opened top defined by a cylindrical wall portion 38. This cylindrical wall portion snugly embraces the cylindrical portion 26d of the stud.

In assembling the stud assembly of this invention the seat 35 is first slipped over the cylindrical portions 26e and 26d of the stud and the bearing ring 30 is next press fitted onto the cylindrical portion 26e of the stud to be bottomed on the shoulder 28. The stud end is then spread to form a rivet head and any portion of the stud projecting beneath the bearing ring 30 is ground off. The seat is thus loosely disposed between the top of the bearing ring 30 and the tapered portion 26c of the stud while the bearing ring is affixed to the stud.

The recess 29 of the stud receives a generally ball shaped seat member 39 having an outturned bead 40 for bottoming on the flat bottom of the stud together with a rounded projection for riding in the depression 22 of the cup member 21.

In the assembly of Figure 1 the spring urged cup 21 will move the stud assembly 25 toward the opening 16 of the socket for seating the seat ring 35 on the socket bearing wall 15 and for seating the bearing ring 30 on the internal wall of the seat. The stud assembly 25 can tilt and rotate relative to the socket 11. During tilting movements of the stud assembly the engaging cylindrical walls 26d of the stud and 38 of the seat will cause movement of the seat with the stud so that the tilting movements are accommodated on the external wall 37 of the seat and the socket wall 15. However the stud 26 is free to rotate about its own axis within the seat 35 and this rotating movement is accommodated by the external wall 33 of the bearing ring and the internal wall 36 of the seat.

As shown in Figure 1 the top of the bearing ring 30 terminates below the cylindrical wall of the seat 35 to allow movement of the ring 30 into full seated engagement with the internal wall of the seat.

The stud 26 can be formed by forging and machining. The formed stud is heat treated to produce a very tough stress resisting member. The seat 35 can be coined from flat stock and after coining it is heat treated to produce a very hard wear resisting member. The bearing ring 30 can be forged or machined and after it is shaped it is heat treated to produce a very hard wear resisting member.

The stud assemblies of this invention include in loose fitting but retained relation thereon a member accommodating tilting movement and receiving a second member therein accommodating rotating movement. Thus the stud assembly has one member accommodating one type of movement and another member accommodating another type of movement with all of the members held in assembled relation.

It will, of course, be understood that various details of construction may be varied through a wide range without departing from the principles of this invention and it is, therefore, not the purpose to limit the patent granted thereon otherwise than necessitated by the scope of the appended claims.

I claim as follows:

1. A composite assembly of metal parts comprising a member composed of tough stress resisting metal having an intermediate enlarged portion and a reduced end portion extending from one end thereof and terminating in an abutment shoulder, a hard metal ring press fitted onto said reduced end portion and bottomed on said shoulder, and a hollow cup shaped member disposed between said enlarged portion and said ring adapted to ride on said ring.

2. A stud assembly comprising a stud composed of tough heat treated steel, said stud having a cylindrical end portion terminating in an outwardly extending shoulder, a bearing ring composed of hard heat treated steel pressed onto said cylindrical end portion and bottomed on said shoulder, said ring having an external side wall accommodating rotating movement, said ring having a recess in its bottom, said end portion of the stud being spread outwardly into said recess of said ring to rivet the ring onto the stud, and a hollow seat member composed of hard heat treated steel surrounding said ring, said seat member having an internal wall rotatable on said ring and an external wall accommodating tilting movement.

3. A stud assembly comprising a tough metal stud having an enlarged intermediate portion, a cylindrical portion extending therefrom, and a reduced diameter cylindrical end extending from said cylindrical portion, said cylindrical portion and said reduced diameter end having an annular shoulder therebetween, a hard wearable seating ring secured on said reduced diameter cylindrical end against said shoulder, and a hard wearable hollow seat member enveloping said ring, said seat member having a cylindrical aperture disposed snugly around said cylindrical portion of the stud and said seat member being retained on the stud between said enlarged portion and said bearing ring.

4. A stud assembly comprising a metal stud having a threaded end, an outwardly tapered frusto-conical portion adjacent said threaded end, a reverse tapered frusto-conical portion adjacent the large end of said outwardly tapered portion, a cylindrical portion adjacent said reversed tapered portion, a reduced diameter cylindrical end adjacent said cylindrical portion, and a shoulder between the cylindrical portion and the cylindrical end, a seat member disposed around said cylindrical portion, and a bearing ring secured on said cylindrical end against said shouluder, said bearing ring having a recess therein and a portion of said stud being spread into said recess.

5. A stud assembly comprising a tough stress resisting stud having an intermediate enlarged portion, a bearing ring secured in fixed relation on an end of the stud in axially spaced relation from said enlarged portion, and a seat ring disposed around the stud for axial movement limited between said bearing ring and said enlarged portion and having an internal bearing wall rotatable on the bearing ring.

6. A tie rod end comprising a socket having an internal bearing wall accommodating tilting movement, a tough stress resisting stud projecting into said socket, said stud having a hard wear resisting bearing ring secured in fixed relation thereon, said bearing ring having an external side wall accommodating rotating movement, and a seat member disposed around said stud having an internal bearing wall receiving said bearing ring in rotatable relation and an external bearing wall tiltable on said socket bearing wall.

7. A tie rod joint comprising a socket having an internal bearing wall accommodating tilting movement, a stud projecting into said socket, said stud having a bearing ring press fitted thereon, said bearing ring having an external side wall of segmental spherical contour, a seat member slidable on said stud having an internal wall receiving said external wall of the bearing ring and an external wall tiltable on said socket wall, and spring means acting on said stud to urge the bearing ring into the seat member and to urge the seat member against the bearing wall of the socket for taking up clearance between the parts as wear develops.

8. A stud assembly comprising a stud member having a cylindrical end terminating in an abutment shoulder, a bearing ring secured on said end against said shoulder, said bearing ring having a top wall extending outwardly from said shoulder, and a seat member on said stud receiving said bearing ring therein, said bearing ring being movable further into said seat member as wear develops between the parts to prevent looseness of the parts.

ANTHONY VENDITTY.